Dec. 21, 1937.  S. H. BERCH  2,102,716

METHOD AND MEANS OF PACKING FOOD PRODUCTS AND THE LIKE

Filed Oct. 26, 1937

INVENTOR.
SAMUEL H. BERCH
BY
ATTORNEYS.

Patented Dec. 21, 1937

2,102,716

UNITED STATES PATENT OFFICE 2,102,716

METHOD AND MEANS OF PACKING FOOD PRODUCTS AND THE LIKE

Samuel H. Berch, Beverly Hills, Calif.

Application October 26, 1937, Serial No. 170,993

6 Claims. (Cl. 99—152)

This invention relates to a method and means of preserving and dispensing food products, and particularly pertains to a method and means of packing food products and is a continuation in part of my application bearing the same title filed by me May 24, 1937, Serial No. 144,409.

It is common practice to confine perishable food products in hermetically sealed containers of glass or metal. Some products, such for example as meats, spices, coffee and tea and the like are sealed within containers under partial vacuum. In the particular case of coffee a large amount of experimental research has been performed, such for example as by the experimental laboratories of Columbia University, and it has been found that roasted coffee develops a material quantity of carbon dioxide gas. The carbon dioxide gas represents the aroma and flavor of the coffee, and the research of the Columbia University has proven that the loss of carbon dioxide appears to be closely related to the loss of flavor and aroma in coffee. This liberation of the occluded gases takes place after the roasting, so that experimental tests prove that within a few days after the roasting of the coffee from forty to fifty percent of the carbon dioxide gases have been liberated from the coffee and the relative freshness of the coffee has dropped in like proportion. Research has also demonstrated that the presence of atmospheric air causes the coffee to become stale and permits oxidization of the coffee oils so that a two-fold action takes place in roasted coffee, one being the liberation of occluded gases to deplete the coffee of its characteristic freshness, and the other being the oxidization of the coffee oils in the presence of atmospheric air to cause the coffee to become rancid. It is, therefore, the principal object of the present invention to provide a method and means of packing coffee in flexible containers in a manner which will prevent the liberation and loss of native coffee gases and prevent the association of the atmosphere with the coffee while contained in the container.

Heretofore attempts have been made to accomplish these results by sealing the coffee in cans having non-collapsible walls which are, of course, impervious to moisture and air. Other attempts to seal the coffee in flexible containers such as cellophane in which the walls are not completely impervious to air or moisture have been attempted. In the use of both of these types of containers it has been common practice to impose a partial vacuum upon the product before sealing it and in some instances to provide an air space within the container which will accommodate the developed gases. With containers heretofore employed it is necessary to provide a space within the container, in which the gases evolved from the freshly ground coffee may expand, for if a space were not provided to receive such gases the internal pressure resulting from such gases would burst the container. In this connection it will be understood that the developed gases create an appreciable degree of pressure within the container, and for that reason the containers are not usually filled completely with coffee. In the instance of using a container having non-collapsible walls the internal pressure is restricted by the wall and the gas passes from the coffee and into the void between the coffee and the top of the container since the coffee is free to shift within the container. In the use of a cellophane container the coffee gases will tend to expand the container and pass into the space left therein for accommodating the gases. The coffee oils or moisture tend to produce deterioration of the container walls. In the cases where the flexible container is completely filled no material for the containers has heretofore yet been developed having sufficient strength to withstand the gas pressure or the deterioration which is produced by oil or moisture in the coffee.

The present invention contemplates the use of a completely filled hermetically sealed flexible elastic container made of a material impervious to air, moisture and coffee oils, and the walls of which container are at all times collapsed against the entire mass of coffee packed therein whereby the surrounding atmospheric pressure will maintain the coffee gases within the coffee grains so that the gases giving the coffee its freshness and flavor will be maintained in its original state within the coffee cells without exerting internal pressure within the container, thereby insuring that the coffee will have a degree of freshness heretofore unknown and unobtainable in roasted packed coffee, and insuring that coffee as here packed will produce more cups of fresh coffee per package than is now obtainable by common method of packing.

The invention contemplates that prior to sealing of the coffee within an inexpansive container the atmospheric air will be withdrawn therefrom and that no space will be provided within the container to accommodate it, thus insuring that since the walls of container are impervious to air, moisture and fats, there will not be any possibility for air or moisture to seep into the container and produce oxidization of the coffee oils or otherwise produce deterioration of the coffee causing staleness, loss of flavor and aroma and rendering it unsuitable for use. It is also an object of the invention to provide a container, the walls of which are not only flexible but elastic so that the walls will not crack under pressure and will not be punctured by the rough edges of the ground coffee grains. In order to facilitate obtaining these characteristics it has been found preferable to use composition known to the trade as "pliofilm", and over which a non-stretching laminated sheet is applied yieldable to the composition sheet by a non-shrinking and non-setting adhesive which insures that the walls of the container will at all times remain soft and will act as a flexible confining cushion for the material, but will not allow the walls of the container to stretch while permitting it to collapse and adding sufficient strength to maintain its shape.

The present invention, therefore, contemplates the provision of a flexible collapsible container impervious to air, moisture and grease and which container is filled completely with ground freshly roasted coffee from which air is excluded and within which the coffee and its occluded aromatic gases are confined within the coffee cells while the coffee package retains its permanent shape.

The invention is illustrated by way of example in the accompanying drawing in which.

Figure 4:
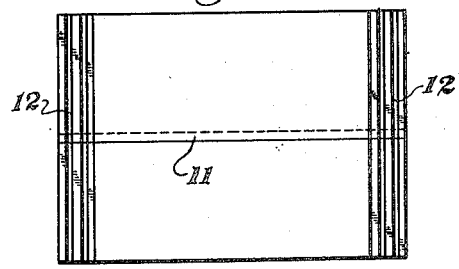
Fig. 4 is a view in plan showing one of the packages with the ends vulcanized and prior to the folding of the vulcanized portions against the ends of the package.

Referring more particularly to the drawing, 10 indicates a coffee package with which the present invention is particularly concerned. This package is preferably formed from material known commercially as "pliofilm" which is a composition having the characteristics of being elastic, pliable, flexible, impervious to moisture and oil and air and capable of forming vulcanized seams which will also be impervious to moisture, air and oil. This material has the additional characteristic of value in that it is not affected by moisture and weather conditions, will not crease, crack or break and will not become brittle or tend to be punctured by the grains of coffee packed within the containers made from it. The containers here shown are preserved in permanent shape and size by an outer non-stretching laminated sheet 7 which is applied to the "pliofilm" sheet 8 by a layer of adhesive 9. The outer sheet 7 may be parchment, glacine or other suitable sheet material. The adhesive material 9 has the peculiar characteristic that while it is effective in maintaining the laminae in associated relation to each other it is non-setting and results that the entire wall structure is at all times flexible and yielding and produces a cushioning action. The various advantages numerated for the material here used are different from those obtained by the use of cellophane and like products since such products are not effectively impervious to air, oil and moisture, are subjected to climatic changes, will become brittle and shrink when exposed to the air and eventually will crack or be punctured by the rough edges of the coffee grains and cannot be vulcanized. The container made from the laminated structure here described is in the form of a tubular section having a vulcanized longitudinal seam as indicated at 11 in Fig. 4 of the drawing. One end of the section is closed by a vulcanized seam 12 after which the bag thus formed is filled completely with coffee. The structure is then placed within a suitable vacuum chamber 14. A closure 16 is fastened over the end of the vacuum chamber and a suction pipe 15 is attached to a suitable apparatus for exerting a suction action within the chamber where the container is sealed. The filled container is then formed with a vulcanized seam 12' at its mouth. This is accomplished by suitable heating and pressure elements 17 mounted upon levers 18 and actuated by a toggle joint 19 and its lever 20. Attention is directed to the fact that while the elements 17 apply heat to the "pliofilm" sheet 8 to vulcanize the same, that due to the fact that the outer sheet 7 is parchment or the like and is interposed between the heating elements and the sheet material there is no tendency for the material to stick to the heating elements and thus nothing occurs during the vulcanizing operation which would tend to separate the vulcanized parts and to allow them to become pervious to air or moisture. The packages may then be packed within an outer container 21 and will be ready for sale.

When the package is sealed it will be obvious that a condition of partial vacuum will occur within the container, and that a condition of normal atmospheric pressure will occur exteriorly of the container and exert a pressure against the container walls. The walls of the container, as has been previously described, comprise an inner sheet of flexible and pliable material which has the additional characteristic of being elastic, and an outer sheet of flexible, pliable material which has the characteristic of being non-stretching. The two sheets are held together by a layer of non-setting adhesive and the seams of the container are held in union due to the previous vulcanization. It is to be understood that before the container is seamed at the mouth it has been filled completely so that the coffee is not loose within the package and so that there are no appreciable voids between the particles of the coffee and within the container. As partial vacuum has been drawn within the container the elastic inner layer of the container wall will collapse against the compacted mass of coffee grains and at points where the sharp edges of the coffee grains protrude this elastic inner material will have a tendency to stretch around these sharp portions to accommodate them without possibility that the grains will rupture the walls of the container. The non-setting layer of adhesive material will also contribute to this action and provide a cushion which will tend to prevent breaking, cracking or rupture from other causes. The outer container wall of non-stretching material will hold the container and its contents in a permanent predetermined shape. It will be recognized that the container walls will have a tendency to collapse due to vacuum conditions within the container and the atmospheric exterior pressure, but that the walls will not be able to stretch since the outer container wall is non-stretching. It has been found by experiments extending over an appreciable period of time that a container having walls of the composite structure as here shown will maintain coffee at an extraordinary and unexpected high degree of freshness at all times. This appears to be due to the fact that the coffee is confined directly within a wall structure impervious to air and moisture and which also is not affected or acted upon by the native coffee oils. This container maintains the coffee compacted at such a high degree that the coffee gases are packed and held within the cells of the coffee grain, all of which action is in a great measure brought about due to the fact that atmospheric pressure at all times is exerting its force against the walls of the container tending to collapse the same and tending to hold the coffee grains in a highly compacted condition, forming a hard solid mass which prevents coffee gases from being evolved from the ground coffee particles while in the package and which enables the package to be maintained in a vacuum condition and in its preformed shape with the coffee gases confined within the cells of the ground coffee particles until the package is opened or unsealed.

Figure 1:
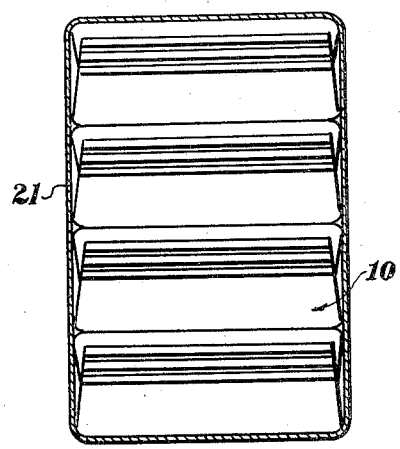
Figure 1 is a view in vertical section and elevation showing a plurality of containers of coffee inclosed within an outer package wall.
Figure 2:
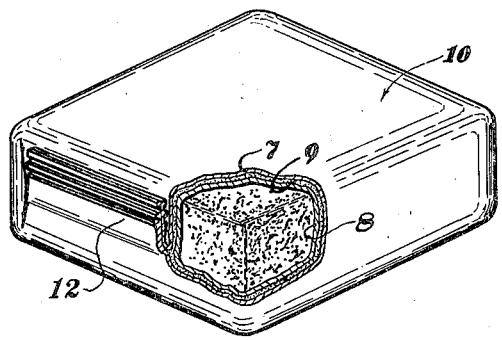
Fig. 2 is a view in perspective showing one of the packages within which the present invention is concerned.
Figure 3:
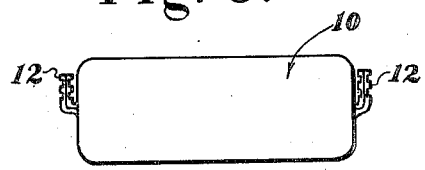
Fig. 3 is a view in side elevation showing one of the packages disclosing the manner in which its ends are vulcanized.

The relatively heavy pressure of the atmospheric air on the exterior of the package maintains the inner elastic sheet continuously in contact with the particles of coffee partially surrounded by it so that there is no air or gas space in which a gas may form, and it has been found by experience that the vacuum condition produced by vulcanizing the package is maintained for an indefinite period. While for convenience of illustration the package in Fig. 2 is shown smooth, in practice the container, due to the compression of the "pliofilm" around the particles of coffee in contact with the inner wall of the container, presents a slightly irregular surface. When the package is vulcanized and sealed, air cannot enter the package and aroma cannot escape therefrom. Other foods than coffee may be processed in the same way as coffee to prevent air from entering the package and retain the flavor or aroma of the packaged material or food.

It will thus be seen that the method and means of packing coffee and the like here shown has novel advantages over present methods and the use of containers now known, in that the coffee will be maintained with its occluded aromatic gases within the coffee cells, that deterioration from air, oil or moisture is completely eliminated and that a flexible yieldable container is provided which will insure the preservation of the aromatic freshness and flavor of the coffee, and the elimination of conditions bringing about the oxidization of the coffee oils or other actions which would render the coffee stale and rancid.

Figure 5:
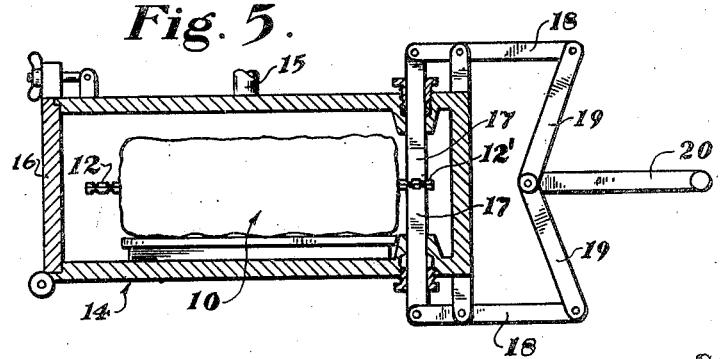
Fig. 5 is a view in section and elevation showing the method of vulcanizing the ends.

While I have shown the preferred method of carrying out my invention, and the preferred means for practicing the same, it is to be understood that various changes might be made in the method and the instrumentalities employed by those skilled in the art without departing from the spirit of the invention as claimed. While the apparatus is for convenience of illustration shown in a horizontal position in Fig. 5 of the drawing, it is preferable to arrange it in a vertical position in use, but it may be arranged in any convenient position. The ground coffee may be packaged in any desired sizes, such as pound packages, third of a pound packages, quarter of a pound packages, and single cup packages, and, as the ground coffee particles are compressed into a hard solid mass, the package may be rectangular or in any other desired form.

Having thus described my invention, what I claim and desire to secure by Letters Patent is:

1. A method of packing roasted coffee which consists in placing roasted coffee within a container capable of collapsing and incapable of distending, said container being formed with a laminated sheet wall including an inner sheet of flexible, pliable and stretchable material impervious to air, moisture and action of coffee oils and an outer flexible non-stretching sheet of material, said sheets being united between their surfaces so as to exclude entrance of air between the two sheets, the container being completely filled with coffee, then exhausting the air from the container causing the walls of the container to collapse around the product and compressing the same into a hard solid mass and hermetically sealing and vulcanizing the inner wall of the container so that the sealed vulcanized ends of the container will also be impervious to moisture and air and the deteriorating action of coffee oils and whereby atmospheric pressure acting against walls of the container will maintain the container in its collapsed position and the coffee in a compacted condition therein.

2. A method of packing coffee within a container, the walls of which include an inner wall of "pliofilm" or the like having the characteristic of being impervious to air, moisture and the deteriorating action of coffee oils and as being flexible, pliable and stretchable, and an outer wall of non-stretching flexible sheet material, the sheet of "pliofilm" and the non-stretching sheet being united between their surfaces so as to exclude entrance of air between the two sheets, which consists in completely filling the container with the coffee, thereafter evacuating the same to cause the walls of the container to collapse around the product and compressing the same into a hard solid mass and then hermetically sealing the inner wall by vulcanization so that the sealed seams and the entire container will be impervious to air, moisture and deteriorating action of coffee oils and whereby the exterior atmospheric pressure will maintain the coffee in its compacted condition, the non-stretching exterior wall preventing distention of the inner wall of the container by atmospheric pressure on the exterior of the container.

3. A method of packing coffee within a container, the walls of which include an inner wall of "pliofilm" or the like having the characteristic of being impervious to air, moisture and the deteriorating action of coffee oils and as being flexible, pliable and stretchable, and an outer wall of non-stretching flexible sheet material, said walls being held together by a non-setting adhesive, which consists in completely filling the container with the coffee, thereafter evacuating the same to cause the walls of the container to collapse around the product and compressing the same into a hard solid mass and then hermetically sealing the inner wall by vulcanization so that the sealed seams and the entire container will be impervious to air, moisture and deteriorating action of coffee oils and whereby the exterior atmospheric pressure will maintain the coffee in its compacted condition, the non-stretching exterior wall preventing distention of the inner wall of the container by atmospheric pressure on the exterior of the container.

4. A vacuum package completely filled with ground coffee comprising a collapsible container of laminated material including an outer flexible sheet of non-stretching material and an inner sheet of flexible pliable stretchable material impervious to air and moisture, said sheets being united between their surfaces so as to exclude entrance of air between the two sheets, said package being vacuumized and hermetically sealed and said container being collapsed around the ground coffee and compressing the same into a hard solid mass, and the inner sheet being stretched over the individual coffee particles in contact with it and conforming to and partially surrounding the same, whereby the native coffee gases are confined within the cells of the coffee particles and the package maintained in its preformed shape and in vacuum condition until the package is unsealed.

5. A vacuum package completely filled with ground coffee comprising a collapsible container of laminated material including an outer non-stretchable sheet of paper material and an inner sheet of "pliofilm", said sheets being united between their surfaces so as to exclude entrance of air between the two sheets, said package being vacuumized and hermetically sealed and said container being collapsed around the ground coffee and compressing the same into a hard solid mass, and the inner sheet being stretched over the individual coffee particles in contact with it and conforming to and partially surrounding the same, whereby the native coffee gases are confined within the cells of the coffee particles and the outer sheet preventing the stretching and distention of the inner sheet by atmospheric pressure on the exterior of the container and maintaining the package in its preformed shape and in vacuum condition until the package is unsealed.

6. A vacuum package completely filled with ground coffee comprising a collapsible container of laminated material including an outer non-stretching sheet of paper material, an inner sheet of "pliofilm" and an intermediate film of non-setting adhesive uniting the two sheets and excluding air from between the same, said package being vacuumized and hermetically sealed and said container being collapsed around the ground coffee and compressing the same into a hard solid mass, and the inner sheet being stretched over the individual coffee particles in contact with it and conforming to and partially surrounding the same, whereby the native coffee gases are confined within the cells of the coffee particles and the outer sheet preventing the stretching and distention of the inner sheet by atmospheric pressure on the exterior of the container and maintaining the package in its preformed shape and in vacuum condition until the package is unsealed.

SAMUEL H. BERCH.